July 26, 1927.
L. HERTENBEIN
1,636,739
ROTARY DRUM FILTERING APPARATUS
Filed June 29, 1925      2 Sheets-Sheet 1
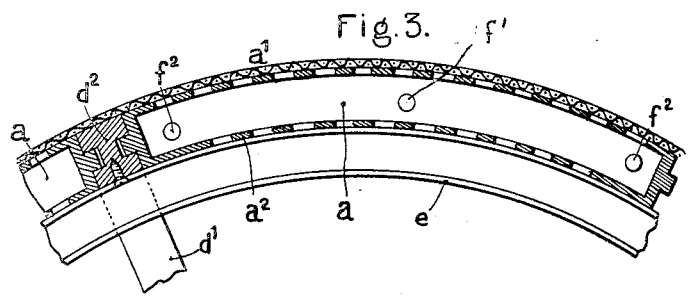
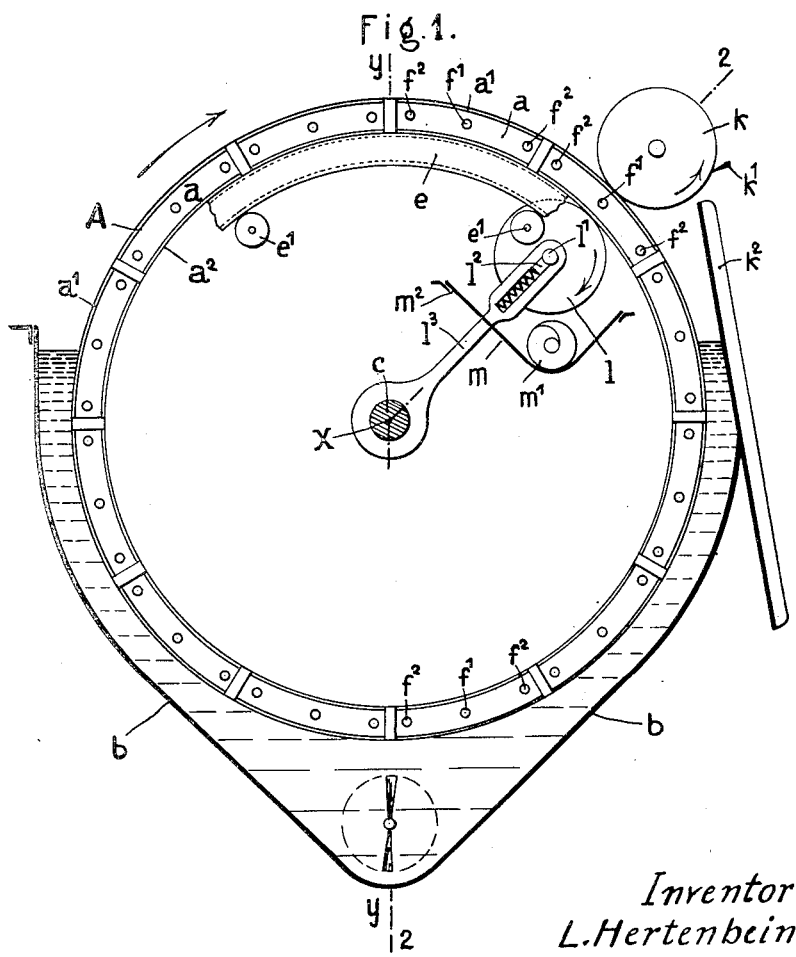
Inventor:
L. Hertenbein
By Langner, Parry, Card & Langner
Attys.

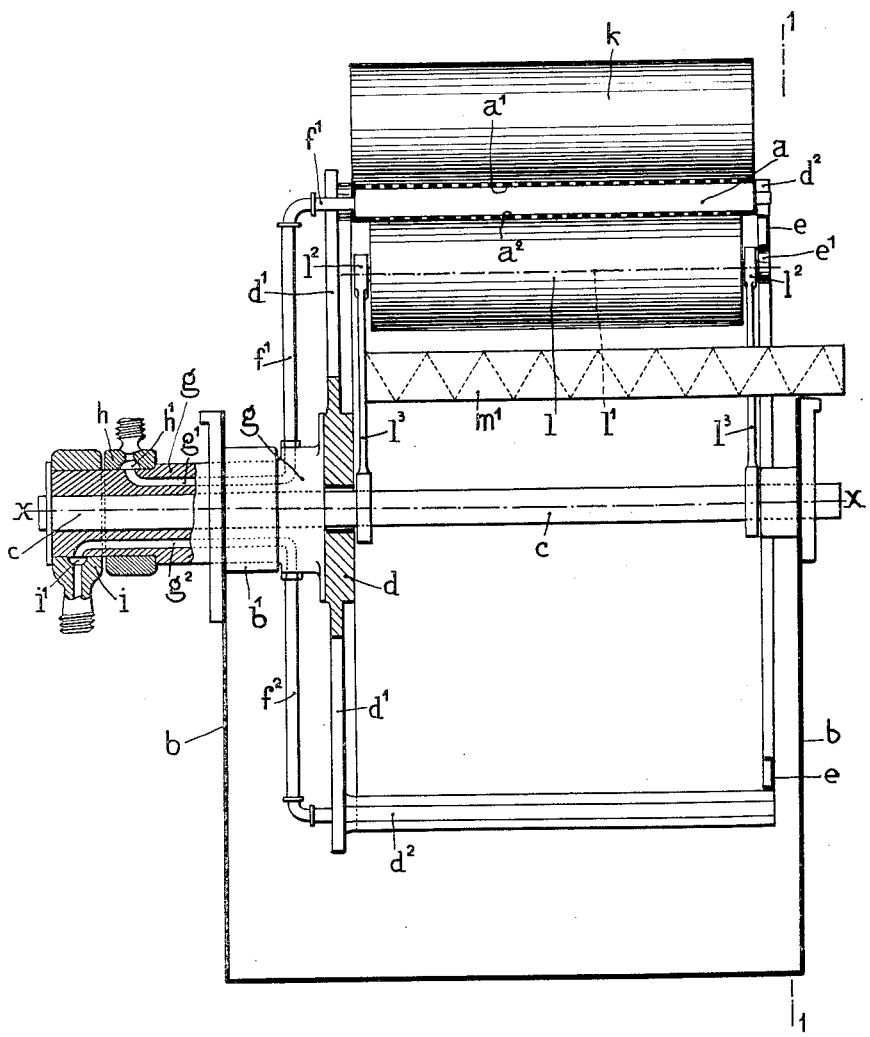

Patented July 26, 1927.

1,636,739

UNITED STATES PATENT OFFICE.

LEON HERTENBEIN, OF LEVALLOIS-PERRET, FRANCE.

ROTARY-DRUM-FILTERING APPARATUS.

Application filed June 29, 1925, Serial No. 40,429, and in France July 2, 1924.

The present invention relates to apparatus for the extraction in the form of sludge of solid substances suspended in liquids, of the type comprising a horizontal drum with filtering surface, revolving in a vat containing liquid charged with solid substances in suspension, the drum being subjected to suction for causing a layer of material in the form of sludge to adhere to the filtering surface, and the suction being followed by a period of blowing or pressure for detaching from the filtering surface the sludge material removed by means of a roller revolving in contact with this surface.

The invention relates more particularly to a means for removing the sludge from the filtering drum in the case where the drum consists of a cylinder having an annular transverse section including a filtering surface on both its interior and exterior face.

In devices of this character up to the present, in order to remove the solid material adhering to the interior filtering surface of the drum, such material has been submitted solely to the action of air forced between the two filtering surfaces in order to remove this matter.

In this manner, however, there has been obtained only an incomplete removal of the material since in drying on the filtering surface, as soon as such surface leaves the liquid being treated, the sludge cracks, and the compressed air escapes through these cracks without properly removing the material.

It has also been proposed to submit the material adhering to the interior filtering surface to the action of a washing liquid in such a manner as to complete the action caused by the compressed air on the material, in order to detach the sludge from the filtering surface. However, in this case the material collected by filtration is obtained only in a condition of dilution by the washing liquid. This arrangement may be useful in the case where it is desired only to recover the liquid treated in the filtering apparatus. However, it does not permit directly obtaining the material adhering to the interior filtering surface of the drum, in a more or less solid state.

According to this invention the means for removing the sludge on the two filtering surfaces of the drum comprise two rollers disposed parallel to each other and facing each other, one of them being at the exterior and the other at the interior of the drum, and functioning for removing the solid matter from the two filtering surfaces.

In this manner it is possible to directly collect the material adhering to the two filtering surfaces of the drum. The air forced into the drum between the two filtering surfaces, in the region where it is desired to produce removal of the solid materials, causes such materials to adhere to the rollers, which rollers by bearing against the filtering surfaces, prevent the layer of sludge from cracking or checking. As a result the solid material is directly recovered in a concentrated state, free from excess water, and in a complete manner.

The annexed drawing represents merely by way of example one form of construction according to the invention.

Figure 1 is a view in transverse section of the apparatus along the line 1—1 of Figure 2.

Figure 2 is a view thereof in longitudinal section along the line 2—2 of Figure 1 parts being in external elevation.

Figure 3 is a detail view representing on a larger scale the arrangement of the filtering boxes at the periphery of the drum.

The filtering drum A receives by any convenient means (not represented) a movement of rotation at a suitable speed around a horizontal axis $x$—$x$ in the interior of a vat $b$ containing the liquid charged with solid substances in suspension; this vat $b$ supports a stationary horizontal shaft $c$ upon which is mounted rotatably a hub $d$ integral with arms $d^1$ which support the filtering drum A.

The latter is constituted by a cylinder of annular transverse section, formed by a series of boxes $a$ juxtaposed at the periphery of the drum; these boxes are fitted for the whole of their length into I-section bars $d^2$ fixed at the extremities of the arms $d^1$ of the hub $d$, the bars being arranged between the boxes $a$ and parallel to the longitudinal axis of the drum for the whole of the length of the boxes.

The exterior and interior longitudinal walls $a^1$ and $a^2$ respectively of each box are constituted for example by perforated sheet metal cover with a filtering fabric; they may likewise be made of any suitable filtering material.

The filtering drum A thus supported at one end by the arms $d^1$ is supported at its other end by a circular track $e$ formed by a U-section member fixed upon the inner flanges of the I-members $d^2$ supporting the drum boxes; this track $e$ passes over rollers $e^1$ arranged internally in relation to the drum.

Instead of being thus suspended at its upper part, the drum A might likewise be supported at its lower part by rollers upon which there would rest a track secured externally of the drum upon the I-bars $d^2$.

This arrangement allows easy and rapid assembly and demounting of the filtering boxes $a$ which can be introduced endwise (from the right in Figure 1) between the I-bars $d^2$, between which they are located, or withdrawn by an opposite movement for cleaning or replacement in case of necessity.

To the end of each box $a$ there are connected three pipes one $f^1$ at the centre and two others $f^2$ near the ends. All the pipes $f^1$, corresponding to the different boxes, are connected to a sleeve $g$ mounted so as to rotate with the drum A upon the fixed horizontal shaft $c$; in the thickness of this sleeve $g$, which continues through a bearing $b^1$ fixed to the vat $b$, there are formed, in the different radial planes of the pipes $f^1$, passages $g^1$ connected to these pipes $f^1$ and extending to register in turn with a distribution port $h^1$ of a given angular extent in the interior of a stationary sleeve $h$ and connected to a pressure or blowing apparatus (not represented). Similarly all the pipes $f^2$ of the filtering boxes connect with corresponding passages $g^2$ formed in the thickness of the sleeve $g$ and extending to register in turn with a distribution port $i^1$ of suitable angular dimensions in the interior of a stationary sleeve $i$ connected to a suction device (not represented).

During the rotation of the drum, the boxes $a$ are placed in communication at the desired moments with the suction and pressure apparatus respectively through the pipes $f^2$, the passages $g^2$ and the distribution port $i^1$, and by the pipes $f^1$, the passages $g^1$ and the distribution port $h^1$.

The sludge which under the action of the suction has adhered to the filtering surface of the boxes $a$ during their period of immersion in the liquid, tends to become detached therefrom under the effect of the pressure produced in these boxes after they have left the liquid; this sludge is removed from the filtering surface of the drum by two rollers $k$ and $l$ arranged parallel to and facing one another, the one $k$ externally of the drum and the other $l$ internally of the latter. The first roller removes the layer of sludge from the outer face $a^1$ and the other from the inner face $a^2$ of the drum filtering boxes; these two rollers $k$ $l$ revolve at the same peripheral speed as the drum, being maintained in contact with the corresponding faces of the drum, the first $k$ by its own weight and the other $l$ due to the fact that its spindle $l^1$ is mounted by means of suitable spring-pressed bearings $l^2$ upon the arms $l^3$ carried by the stationary shaft $c$. The two rollers $k$ and $l$ are preferably located as shown to one side of the axial vertical plane $y$—$y$ of the drum and behind this plane in relation to the direction of rotation of the drum (Figure 1) as has been described in the specification of the French Patent 574,678 filed in the above name on the 12th March 1923 (British Patent No. 212,907) for the single removal roller employed in that case.

The caked sludge removed by the roller $k$ is detached from the latter by a scraper $k^1$ which causes it to fall upon an inclined plate $a^2$. The sludge removed by the roller $l$ falls into a gutter or channel $m$ arranged horizontally below the roller and comprising at its bottom part an Archimedean screw conveyor $m^1$ which effects the removal of the sludge. This gutter $m$ is extended laterally (Figure 1) at $m^2$ on the side situated in advance of the roller $l$ in relation to the direction of rotation of the drum, in such a way that the gutter receives any sludge which might by itself at the moment of the application of pressure become detached from the inner face of the drum, before being removed from the latter by the roller $l$.

As can readily be understood, this drum with external and internal filtering surfaces, has an output almost double that of the rotary filters in which only the outside surface of the drum is utilized for the filtration.

It is to be understood that without departing from the principle of the invention there may be applied thereto a large number of modifications of detail in the construction described and illustrated, for example as regards the construction and method of mounting the filtering boxes, the method of supporting the drum, the arrangement utilized for producing the suction and the pressure in the interior of these boxes and so on.

What I claim is:

1. In a rotary drum filtering apparatus for the extraction, in the form of sludge, of solid substances suspended in liquids, the combination of a drum having a cylinder of annular cross section provided with a filtering surface upon its external and internal faces, suction means to cause the solid matter suspended in the liquid to adhere in the form of sludge to both filtering surfaces over the major part of the circumference of the drum, pressure means, acting on the emerged area of the drum upon the solid matter adhering to the filtering surfaces and arranged to detach such matter therefrom, two rollers arranged parallel to and facing one another, one on the exterior and the other in the interior of the drum, in contact with the external and internal filtering surfaces of the drum and arranged to remove the sludge therefrom.

2. In a rotary drum filtering apparatus for the extraction, in the form of sludge, of solid substances suspended in liquids, a drum having a cylinder of annular cross section, a fixed shaft carrying the drum, a hub rotatably mounted at one end of the shaft, radial arms secured to the hub, spaced members arranged along the generatrices of the drum and carried by the radial arms, and boxes fitted between the spaced members at the periphery of the drum and provided with outer and inner walls having filtering surfaces.

3. In a rotary drum filtering apparatus for the extraction, in the form of sludge, of solid substances suspended in liquids, a drum having a cylinder of annular cross section, a fixed shaft carrying the drum, a hub rotatably mounted at one end of the shaft, radial arms secured to the hub, spaced members arranged along the generatrices of the drum and carried by the radial arms, a circular track fixed to the members at the other end of the drum, rollers supporting the track, and boxes fitted between the spaced members at the periphery of the drum and provided with outer and inner walls having filtering surfaces.

4. In a rotary drum filtering apparatus for the extraction, in the form of sludge, of solid substances suspended in liquids, a drum having a cylinder of annular cross section, a fixed shaft carrying the drum, a hub rotatably mounted at one end of the shaft, radial arms secured to the hub, spaced members arranged along the generatrices of the drum and carried by the radial arms, and boxes fitted between the spaced members at the periphery of the drum and provided with outer and inner walls having filtering surfaces, suction means to cause the solid matter suspended in the liquid to adhere in the form of sludge to both filtering surfaces over the major part of the circumference of the drum, pressure means, acting on the emerged area of the drum upon the solid matter adhering to the filtering surfaces and arranged to detach such matter therefrom, two parallel, facing rollers at, and in contact with, the exterior and interior filtering surfaces for removing sludge therefrom.

5. In a rotary drum filtering apparatus for the extraction, in the form of sludge, of solid substances suspended in liquids, a drum having a cylinder of annular cross section, a fixed shaft carrying the drum, a hub rotatably mounted at one end of the shaft, radial arms secured to the hub, spaced members arranged along the generatrices of the drum and carried by the radial arms, a circular track fixed to the members at the other end of the drum, rollers supporting the track, and boxes fitted between the spaced members at the periphery of the drum and provided with outer and inner walls having filtering surfaces, suction means to cause the solid matter suspended in the liquid to adhere in the form of sludge to both filtering surfaces over the major part of the circumference of the drum, pressure means, acting on the emerged area of the drum upon the solid matter adhering to the filtering surfaces and arranged to detach such matter therefrom, two parallel, facing rollers at, and in contact with, the exterior and interior filtering surfaces for removing sludge therefrom.

In testimony whereof I have signed my name to this specification.

LEON HERTENBEIN.